(12) United States Patent
An

(10) Patent No.: US 6,544,323 B2
(45) Date of Patent: Apr. 8, 2003

(54) AQUEOUS INK COMPOSITION WITH METALLIC GLITTERING

(75) Inventor: Tung-Gul An, Daejeon (KR)

(73) Assignee: Dang-A Pencil Co., Ltd., Seoul (KR)

(*) Notice: Subject to any disclaimer, the term of this patent is extended or adjusted under 35 U.S.C. 154(b) by 113 days.

(21) Appl. No.: 09/879,209

(22) Filed: Jun. 13, 2001

(65) Prior Publication Data

US 2002/0148387 A1 Oct. 17, 2002

(30) Foreign Application Priority Data

Feb. 13, 2001 (KR) .......................... 2001-7088

(51) Int. Cl.⁷ .................. C09D 11/02; C09D 11/08; C09D 11/14; C09D 5/38
(52) U.S. Cl. ................. 106/31.68; 106/31.69; 106/31.94; 106/31.73; 106/31.84; 106/31.6
(58) Field of Search .............. 106/31.68, 31.69, 106/31.6, 31.94, 31.73, 31.84, 31.83

(56) References Cited

U.S. PATENT DOCUMENTS

| 5,990,219 A | * | 11/1999 | Sakai et al. ............. 524/441 |
| 2002/0007768 A1 | * | 1/2002 | Yoshimura et al. ......... 106/400 |
| 2002/0128350 A1 | * | 9/2002 | Yoshimura et al. ......... 523/160 |

* cited by examiner

Primary Examiner—Mark L. Bell
Assistant Examiner—Veronica F. Faison
(74) Attorney, Agent, or Firm—Finnegan, Henderson, Farabow, Garrett & Dunner, L.L.P.

(57) ABSTRACT

The present invention relates to an aqueous ink composition with metallic glittering, more particularly to an aqueous ink composition with metallic glittering having an excellent glittering appearance, three-dimensional effect, writing aptitude comprising a metal-coating resin component, colorant, water-soluble resin, water-soluble organic solvent, and water.

14 Claims, No Drawings

AQUEOUS INK COMPOSITION WITH METALLIC GLITTERING

This application claims priority of Korea patent Application No. 2001-0007088, filed on Feb. 13, 2001, the content of which is incorporated herein by reference.

BACKGROUND OF THE INVENTION (a) Field of the Invention

The present invention relates to an aqueous ink composition with metallic glittering, more particularly to an aqueous ink composition with metallic glittering having an excellent glittering appearance, three-dimensional effect, and smooth writing performance.

(b) Description of the Related Art

In order to obtain handwriting having metallic luster such as a gold and silver, various aqueous ink compositions have been proposed using glittering pigments. For example, an aqueous ink composition using aluminum powder pigment was proposed in Japanese Patent Publication No. 7-118592, and an ink composition using pearl pigment was proposed in Japanese Patent Publication No. 8-151547. Japanese Patent Publication No. 11-29734 also proposes metallic aqueous ink prepared by coloring aluminum powder with an organic pigment using a fixer. However, in the case of conventional aqueous ink compositions of prior art, the use of glittering pigment such as aluminum powder pigment, and pearl pigment and the like, can obtain a glittering appearance and three-dimensional effect, but it is not to a desirable level. Also, other methods have been adopted using a coloring method applying colorants such as dyes and pigments, in order to obtain a metallic color, however, this method also results in a loss of glittering effect due to the use of resin during the coloring step.

To resolve the above problems, EP No. 1,038,931 proposes a technique improving the metallic luster of the ink composition using an inorganic pigment coated with a metal. However, because the aqueous glittering ink composition prepared by the above method uses metal-coating inorganic pigment of a large density, it deteriorates the writing aptitude due to the increase in the weight of the ink composition, and has a high possibility of a precipitate form in storage.

SUMMARY OF THE INVENTION

It is an object of the present invention to provide an aqueous ink composition with metallic glittering having a strong glittering appearance greater than the ink composition of prior art, simultaneously having an excellent dispersible nature, without the possibility of a precipitate form due to the light density of the ink composition, as well as handwriting having a vivid three-dimensional effect, or coating film, which is unobtainable in conventional ink compositions.

In order to achieve the above objects, the present invention provides an aqueous ink composition with metallic glittering comprising a metal-coating resin component, a colorant, a water-soluble resin, a water-soluble organic solvent, and water.

DETAILED DESCRIPTION OF THE PREFERRED EMBODIMENTS

The present invention is described in detail as follows.

The present invention, in order to increase the metallic glittering property, can provide an excellent handwriting or coating film art by using a metal-coating resin component coated with more metal than is generally used in aqueous ink compositions having glittering pigments of prior art.

The present invention can also reduce the weight of the ink composition and improve the dispersible nature, due to the use of a metal-coating resin component having light density and small particles, compared with the method using metal-coating inorganic pigment in EP 1 038 931.

The aqueous ink composition with metallic glittering of the present invention comprises a metal-coating resin component, a colorant, a water-soluble resin, a water-soluble organic solvent, and water.

The metal-coating resin component is composed of closely adhering and laminating mutually soluble resin coating film and metallic deposition film, which has electro-conductivity due to the coating of the metallic deposition film. These are composed of closely adhering and laminating mutually metallic deposition film/resin coating film, or resin coating film/metallic deposition film; or may be prepared by repeatedly coating a constituent unit of metallic deposition film/resin coating film. Also, the present invention can prevent falloff of the metallic luster by inhibiting the extreme agglomeration of metallic deposition film closely adhering and laminating a second resin coating film on the resin coating film/metallic deposition film.

These metal-coating resin components may be prepared by a conventional coating method such as the Roll coating method, the Gravure coating method, the Reverse coating method, and the spray coating method etc. An example is described as follows.

First, in order to coat the resin coating film layer on a base film, a suitable coating solution is prepared, and a metallic film is formed by depositing the metal on the base: the metallic film is a closely adhered to the resin coating film and metallic deposition film mutually. Then, the metallic film is peeled and grinded from the base film, and as a result, the metal-coating resin component may be obtained.

In the method above, the resin coating film is coated on the base film applying a release layer, and metallic deposition film is formed on the above film, and then a metal-coating resin component having resin coating film on above and below the metallic deposition of the surface may also be obtained by coating the resin coating film as the same resin coating film or the second resin coating film. In the above method, the resin coating film is coated on the base film applying the release layer, and metallic deposition film is formed on the above film, and then the metal-coating resin component having a repeat unit of resin coating film/metallic deposition film also may be obtained by repeating the same procedure many times, preferably three times.

The base film supports the metallic film formation, and preferably the base film is used, which is inactive in the coating resin. The example of the embodiment of the base film comprises resin such as polyester, polyamide, polyethylene, polypropylene, cellulose acetate, polycarbonate, polyvinyl chloride, fluorinated resin etc.; and cellophane etc.

Also, the release layer more easily releases the metallic film from the base film, which can be used to thermoset the silicone resin as an inert film for the coating resin.

In the present invention, a resin for the resin coating film dissolves in water or organic solvent of ink composition of the present invention, it is preferably the same as the water-soluble resin of the ink composition or resin having compatibility with the resin. For example, the resin may be used, at least one selected from the group consisting of polyvinyl chloride, vinyl chloride, nitro cellulose, cellulose acetic acid, ethyl cellulose, polyvinyl alcohol, casein, gelatin, vinyl chloride-vinyl acetic acid copolymer resin, butyral resin, acryl resin, polyamide resin, polyester resin, and epoxy resin.

The thickness of the resin coating film is from 0.1 to 5 μm, more preferably from 0.5 to 3 μm. Wherein, if the thickness is less than 0.1 μm, it may not obtain a suitable metallic luster due to the difficulty of continuously forming the resin coating film. If the thickness is more than 5 μm, in the case of the application in ink, paint, and adhesive and the like, there is a lack of metallic luster and falloff of electro-conductivity due to the small ratio of metal component among the total composition.

A metal coating in the resin component may be used, at least one selected from the group consisting of gold, silver, aluminum, copper, nickel, zinc, potassium, indium, and chromium, or metal oxide may be used, such as alloy metal comprising stainless steel or tin oxide, and indium oxide etc. Preferably, when aluminum and copper are used, it has the effect of a metallic luster, electro-conductivity, reducing costs etc.

The coating thickness of the metallic deposition film is 0.02 to 5 μm, wherein if the thickness is less than 0.02 μm, the content of the metallic deposition film relative to the content of the resin coating film becomes few, therefore it is difficult to obtain an expectative physical properties in case of application as ink composition. If the thickness is greater than 5 μm, it is uneconomical and difficult to grind due to the use of many metals, also it is difficult to disperse in case of application as the ink composition.

The metallic deposition carried out by the conventional metal coating formation methods such as vacuum deposition method, sputtering method, and ion fretting etc., can result in the metal-coating resin component.

Also, the resin used in the second resin coating film is an insoluble in the ink composition of the present invention, and prevents the loss of a metallic brightness characteristic. The resin may be coated anywhere above and below the surface of the metallic deposition film, wherein the resin may be used all the resin that the characteristic of the ink composition is not reduced. For example, the resin comprises thermoplastic resin, and thermosetting resin etc., more preferably is at least one selected from the group consisting of acrylic resin, vinyl chloride-vinyl acetic acid copolymer resin, polyvinyl butyral, polycarbonate, urethane resin, urea resin, melamine resin, urea-melamine resin, epoxy resin, alkyd resin, amino alkyd resin, and rosin modified maleic acid resin. The second resin coating film is also coated from 0.1 to 5 μm, more preferably 0.5 to 3 μm as the same resin coating film.

The metal-coating resin component prepared in this way may display a metallic luster effect such as silver color, gold color, red color, blue color, green color, and purple color etc. An average diameter of the metal-coating resin component is preferably 5 to 200 μm. If a diameter is less than 5.0 μm, it is not preferred as the glittering effect is reduced by the resin component particles being too small. If the diameter is greater than 200 μm, when the metal-coating resin component is used in ink type for ballpoint pen, the ink from pen tip is difficult to flow.

In the present invention, the amount of the metal-coating resin component is preferably 0.01 to 40 wt %, more preferably 0.5 to 30 wt % relative to total ink composition. If the amount of resin component is less than 0.01 wt %, the glittering appearance is not satisfied. An amount of resin component more than 40 wt % is not preferred as it reduces the fluidity due to the viscosity of ink being too high.

Also in relation to the ink composition of the present invention, a metal-coating resin component may be used by mixing a pigment, at least one selected from the group consisting of glittering pigment including aluminum powder pigment or pearl pigment; an opaque pigment including tin oxide, and alkylene bis(melamine) derivatives; and an opaque plastic pigment.

The aqueous ink composition with metallic glittering of the present invention also uses a colorant form of pigment dispersion liquid to control various ink colors. Wherein, the colorant is preferably a high-solubility colorant, which does not react to the metal-coating resin component, and does not affect the coloring of the metal-coating resin component. The embodiment example of the colorant comprises water-soluble dye such as acidic dye, directive dye, and basic dye; inorganic pigment such as carbon black and tin oxide; fluorescent pigment; and coloring resin emulsion etc. The amount of the colorant is 0.01 to 30 wt %, more preferably 0.05 to 20 wt % relative to total ink composition.

Also, the present invention uses water-soluble resin, preferably water-soluble thickening resin, which is capable of easily dispersing the metal-coating resin component and preventing precipitation thereof. The embodiment of the water-soluble resin comprises microbial polysaccharides and derivatives thereof such as pullualn, xanthan gum, whelan gum, rhamsan gum, succinoglucan and dextran; water-soluble vegetable polysaccharides and derivatives thereof including tragacanth gum, guar gum, tara gum, locust bean gum, ghatti gum, arabinogalactan gum, gum arabic, quince seed gum, pectin, starch, psyllium seed gum, carrageennan, alginic acid, argar etc.; and water-soluable animal polysaccharides and derivatives thereof including gelatin, casein, and albumin. More preferably, the microbial polysaccharides and derivatives thereof may be used either alone or in a mixture of more than two. The amount of the water-soluble resin is used 0.01 to 40 wt %, preferably 0.05 to 20 wt % relative to total ink composition.

Also, the ink composition of the present invention uses a water-soluble solvent in order to dry the pen tip and prevent freezing of ink. The embodiment of the water-soluble solvent is at least one selected from the group consisting of glycol such as ethylene glycol, diethylene glycol, triethylene glycol, propylene glycol and polyethylene glycol; polyvalence alcohol such as glycerin; and glycol ether such as ethylene glycol monomethyl ether, diethylene glycol monomethyl ether, dipropylene glycol monomethyl ether and dipropylene glycol monopropyl ether. The amount of the water-soluble organic solvent is preferably used 1.00 to 40 wt %, more preferably 5.00 to 20 wt % relative to total ink composition.

Moreover, the remaining component in the ink composition of the present invention comprises ion exchange water. As necessary, lubricants may be added, such as dicarboxylic amides, polyoxyethylene alkali metal salts, phosphates and N-oleyl sarcosine salts etc.; rust-inhibitors such as benzotriazole and tolytriazole dicyclohexyl ammonium nitrate etc.; antiseptic mildew-proofing agents such as benzoisothiazolin-type, pentachlorophenol-type and cresol etc.; and various surfactants.

The aqueous ink composition with metallic glittering of the present invention may be prepared by a conventional dispersing method, degassing techniques, filtering methods etc., the present invention is not limited to the methods.

As mentioned above, the aqueous ink composition with metallic glittering according to the present invention may be used in a variety of applications, as the aqueous ink composition with metallic glittering for writing tools (preferably an aqueous ink composition with metallic glittering for ball-point pens), printing, coating, and cosmetic etc. due to having an excellent luster, and three-dimensional effect.

Hereinafter, the present invention is described more in detail through Examples and Comparative Examples. However, the following Examples are only for the understanding of the present invention, and the present invention is not limited to the following Examples.

EXAMPLES

Preparation Example 1

(Preparation of the metal-coating resin component consisting of resin coating film/metallic deposition film)

The coating solution was prepared by dissolving 15 wt % of methyl methacrylic acid resin in a mixture of 75 wt % of toluene and 10 wt % of ethyl acetate. Then, the coating solution on polypropylene film of 30 μm thickness was coated and dried by coating the Gravure printing method to form the resin coating film of 1 μm thickness. Then, aluminum on the resin coating film was deposited by vacuum deposition method to form the metallic deposition film of 0.3 μm thickness. Thereafter, the metal film closely contacting the resin coating film and the metallic deposition film was released from the polypropylene film, and then followed by grinding in a hammer mill to obtain the metal-coating resin component of 5 μm of an average granularity.

Preparation Example 2

(Preparation of the metal-coating resin component consisting of resin coating film/ metallic deposition film/resin coating film/metallic deposition film/resin coating film/ metallic deposition film)

The metal-coating resin component consisting of resin coating film/metallic deposition film/resin coating film/ metallic deposition film/resin coating film/metallic deposition film obtained 5 μm of an average granularity by the same procedure as in Preparation Example 1, except that the same procedure on film formed the resin coating film and the metallic deposition film was repeated twice.

Preparation Example 3

(Preparation of the metal-coating resin component consisting of resin coating film/metallic deposition film/resin coating film A)

The metal-coating resin component consisting of resin coating film/metallic deposition film/resin coating film A obtained 5 μm of an average granularity by the same procedure as in Preparation Example 1, except that the mixture solution on film forming the resin coating film and the metallic deposition film was coated. The mixture solution was prepared by dissolving mixture of 25 wt % of thermosetting acryl resin and 15 wt % of vinyl acetic acid-maleic acid copolymer resin in mixture consisting of 25 wt % of methyl ethyl ketone, 25 wt % of toluene, and 10 wt % of butyl acetic acid.

Example 1 to 10

Each of the components having the content such as the following shown in Table 1 and 2 was mixed and evenly dispersed by a conventional stirring method, except the water-soluble resin. Then, the water-soluble was added, thereafter the residue was filtered, and gas was removed to prepare the aqueous ink composition with metallic glittering.

Comparative Example 1 to 2

The aqueous ink composition with metallic glittering was prepared by the same procedure as in Example 1 with a composition and a content of the following Table 1, except the nonuse of the metal-coating resin component of Preparation Example 1 to 3.

Comparative Example 3 to 5

The aqueous ink composition with metallic glittering was prepared by the same procedure as in Example 1 with a composition and a content of the following Table 2 except that the content of metal-coating resin component of Preparation Example 1 to 3 was used beyond the scope of the present invention.

Wherein, each of the components used in Examples and Comparative Examples was shown as follows.

Annotation)

1) Aluminum powder pigment: Trade Mark "WXM0630", the products of Toyo Aluminum CO., Ltd., an average particle size=about 8 μm
2) Pearl pigment: Trade Mark "Iriodin 302", the products of Merck Japan Limited, an average particle size=about 5~20 μm
3) Rhamsan resin: Trade Mark "K7C233", the products of Sansho CO., Ltd.
4) Whelan resin: Trade Mark "K1C376", the products of Sansho CO., Ltd.
5) Yellow colorant: Trade Mark "Yellow 202(1)", Acid Yellow 73, Aizen CO., Ltd.
6) Red colorant: Trade Mark "Chugai Aminol First pink R", xanthen-type, Chugai Kasei CO., Ltd.
7) Pigment base: A pigment dispersion of the pigment base was prepared, in the form of water dispersion of the pigment(average particle size=0.08 μm; solid=10 wt %), by adding and dissolving triethylamine to the mixture with mixing in the weight ratio shown in the following blue pigment of 12: the resin for the pigment dispersion=5:1, and followed by using Ball Mill. The pigment base was prepared by using styrene-acryl copolymer (Trade Mark "JOHNCRYL J683", Johnson Polymer Co., Ltd., average molecular weight=8000) for the pigment dispersion.
8) 1,2-benzothiazolin-3 on: Trade Mark "Proxell GXL", Hoechst Synthesis CO., Ltd.
9) Xanthan resin: Trade Mark "Kelzan", manufactured by Kelco a unit Monsanto Company.
10) Succinoglycan: Trade Mark "Reozan", Sansho Co., Ltd.
11) Yellow resin emulsion: Trade Mark "LUMIKOL NKW-2105", yellow fluorescent pigment, Nippon Keiko Kagaku Co., Ltd.
12) Blue pigment: Trade Mark "Firstgen Blue TGR", phthalocyanine blue, Dainippon Ink & Chemicals, Inc.

Experimental Example

The ink composition of the Example 1 to 10 and Comparative Example 1 to 5 was filled into each of the ink containers made of a hollow polypropylene tube equipped with a ballpoint pen tip made of stainless steel (ball material: silicon carbide). The ballpoint pen with the ink containers was prepared in the test sample. Then, the glittering appearance, the three-dimensional effect and the writing performance of each of the ink compositions were evaluated by hand writing in commercially available loose-leaf sheets of paper with the ballpoint pen. The results of the evaluation are shown the following Table 1 and Table 2.

1) Glittering appearance: The glittering appearance was evaluated by the visual observation of writing conditions. A criterion was indicated with '0' for results having a strong glittering appearance; and 'x' for results having little or no glittering appearance.
2) Three-dimensional effect: The three-dimensional effect was evaluated through visual sensation, and the evaluation method was indicated with '0' for results having three-dimensional effect; and 'x' for results having no three-dimensional effect.
3) Writing performance: The writing performance was evaluated through a sensation when the writing, and the evaluation method was indicated with '0' for results having an excellent writing performance; and 'x' for results having a poor or not a smooth writing performance.

TABLE 1

| Division (wt %) | | Example | | | | | | Comparative Example | |
|---|---|---|---|---|---|---|---|---|---|
| | | 1 | 2 | 3 | 4 | 5 | 6 | 1 | 2 |
| Glittering pigment | Aluminum powder pigment[1] | — | — | — | — | 2.5 | — | 5.0 | — |
| | Pearl pigment[2] | — | — | — | — | — | 2.5 | — | 10.0 |
| | Preparation Example 1 | 7.0 | — | 7.0 | — | 2.5 | — | — | — |
| | Preparation Example 2 | — | 5.0 | — | — | — | — | — | — |
| | Preparation Example 3 | — | — | — | 5.0 | — | 2.5 | | |
| Water-soluble resin | Rhamsan resin[3] | 0.3 | — | — | — | 0.3 | — | 0.3 | — |
| | Whelan resin[4] | — | 0.3 | 0.2 | 0.3 | — | 0.3 | — | 0.3 |
| Colorant | Yellow colorant[5] | 1.0 | — | — | — | — | — | — | — |
| | Red colorant[6] | — | — | 2.0 | 1.0 | — | 1.0 | — | — |
| | Pigment base[7] | — | 20.0 | — | — | — | — | — | — |
| Water-soluble organic solvent | Glycerin | 5.0 | 5.0 | — | 5.0 | 5.0 | 5.0 | 5.0 | 5.0 |
| | Dipropylene glycol monopropyl ether | — | — | 7.0 | — | — | — | — | — |
| | Propylene glycol | — | — | 14.0 | — | — | — | — | — |
| Antiseptic | mildew-proofing agent[8] | 0.1 | 0.1 | 0.1 | 0.1 | 0.1 | 0.1 | 0.1 | 0.1 |
| Rust-inhibitor | Benzotriazloe | 0.1 | 0.1 | 0.1 | 0.1 | 0.1 | 0.1 | 0.1 | 0.1 |
| Lubricant | Maleic monoamide | 1.2 | 1.2 | 1.2 | 1.2 | 1.2 | 1.2 | 1.2 | 1.2 |
| | Water | 85.3 | 68.3 | 68.4 | 87.3 | 88.3 | 87.3 | 88.3 | 83.3 |
| Evaluation | Glittering appearance | ○ | ○ | ○ | ○ | ○ | ○ | x | x |
| | Three-dimensional effect | ○ | ○ | ○ | ○ | ○ | ○ | x | x |
| | Writing performance | ○ | ○ | ○ | ○ | ○ | ○ | x | x |

As shown in Table 1, Example 1 to 6 reveals a strong glittering appearance, three-dimensional effect, and smooth writing performance. While, in the case of Comparative Example 1 and 2, there was a weak glittering appearance, and no three-dimensional effect.

invention reveals handwriting having an excellent writing performance and luster. On the other hand, in Comparative Example 4 and 5 the omission of the resin component did not result in a satisfactory glittering appearance or writing performance.

TABLE 2

| Division (wt %) | | Example | | | | Comparative Example | |
|---|---|---|---|---|---|---|---|
| | | 7 | 8 | 9 | 10 | 4 | 5 |
| Glittering pigment | Preparation Example 1 | 0.01 | — | — | 40.0 | 0.005 | 50.0 |
| | Preparation Example 2 | — | 0.5 | 30.0 | — | — | — |
| Water-soluble resin | Rhamsan resin[3] | — | — | — | — | 0.3 | 0.3 |
| | Xanthan resin[9] | 0.3 | 0.3 | — | — | — | — |
| | Sucinoglycan[10] | — | — | 0.3 | 0.3 | — | — |
| Colorant | Yellow emulsion[11] | 1.0 | 1.0 | 1.0 | 1.0 | — | — |
| Water-soluble organic solvent | Glycerin | 5.0 | 5.0 | 5.0 | 5.0 | 5.0 | 5.0 |
| Antiseptic mildew-proofing agent[8] | | 0.1 | 0.1 | 0.1 | 0.1 | 0.1 | 0.1 |
| Rust-inhibitor | Benzotriazloe | 0.1 | 0.1 | 0.1 | 0.1 | 0.1 | 0.1 |
| Lubricant | Maleic monoamide | 1.2 | 1.2 | 1.2 | 1.2 | 1.2 | 1.2 |
| | Water | 92.29 | 91.8 | 62.3 | 52.3 | 93.295 | 43.3 |
| Evaluation | Glittering appearance | ○ | ○ | ○ | ○ | x | ○ |
| | Three-dimensional effect | ○ | ○ | ○ | ○ | ○ | x |
| | Writing performance | ○ | ○ | ○ | ○ | x | x |

Also, in Table 2, Examples 7 to 10 comprising 0.01 to 40 wt % of the metal-coating resin component of the present As mentioned above, the aqueous ink composition with metallic glittering of the present invention, in the case of application as the ink composition for writing tools, ink for printing, coating and the like, has an excellent glittering appearance, three-dimensional effect, and smooth writing performance due to comprising the metal-coating resin component and colorant etc giving the glittering appearance. In particular, the aqueous ink composition with metallic glittering has a very low possibility of forming precipitation, reducing the weight of the ink composition, and an excellent dispersible nature due to using a low-density metal-coating resin component.

What is claimed is:

1. Aqueous ink composition with metallic glittering comprising a metal-coated resin or resin-coated metal component, a colorant, a water-soluble resin, a water-soluble organic solvent, and water.

2. The composition as claimed in claim 1, wherein the metal-coated resin or resin-coated metal component is composed of closely adhering and laminating mutually soluble resin coating film and metallic deposition film.

3. The composition as claimed in claim 2, wherein the resin coating film is coated from 0.1 to 5 $\mu$m.

4. The composition as claimed in claim 2, wherein the resin used in resin coating film is at least one selected from the group consisting of polyvinyl chloride, vinyl chloride, nitrocellulose, cellulose acetic acid, ethyl cellulose, polyvinyl alcohol, casein, gelatin, vinyl acetic acid-vinyl chloride copolymer resin, butyral resin, acrylic acid resin, polyamide resin, polyester resin, and epoxy resin.

5. The composition as claimed in claim 2, wherein the metal used in metallic deposition film is at least one selected from the group consisting of gold, silver, aluminum, copper, nickel, potassium, indium, and chromium; or metal oxide selected from the group consisting of alloy metal comprising stainless steel or tin oxide, and indium oxide.

6. The composition as claimed in claim 2, wherein the metallic deposition film is coated from 0.02 to 5 $\mu$m.

7. The composition as claimed in claim 1, wherein the metal-coated resin or resin-coated metal component comprises a second resin coating film.

8. The composition as claimed in claim 7, wherein the resin used in the second resin coating film is selected from the group consisting of acrylic resin, vinyl chloride-vinyl acetic acid copolymer resin, polyvinyl butyral, polycarbonate, urethane resin, urea resin, melamine resin, urea-melamine resin, epoxy resin, alkyd resin, amino alkyd resin, and rosin modified maleic acid resin.

9. The composition as claimed in claim 7, wherein the second resin coating film is coated 0.1 to 5 $\mu$m.

10. The composition as claimed in claim 1, wherein the metal-coated resin or resin-coated metal component comprises 0.01 to 40 wt % relative to total ink composition.

11. The composition as claimed in claim 1, wherein the metal-coating resin component has 5 to 200 $\mu$m relative to total ink composition.

12. The composition as claimed in claim 1, wherein the colorant comprises 0.01 to 30 wt % relative to total ink composition.

13. The composition as claimed in claim 1, wherein the water-soluble resin comprises 0.01 to 40 wt % relative to total ink composition.

14. The composition as claimed in claim 1, wherein the composition comprises a pigment which is at least one selected from the group consisting of glittering pigment selected from aluminum powder pigment or pearl pigment; opaque pigment selected from tin oxide, or alkylene bis (melamine) derivatives; and opaque plastic pigment.

* * * * *

UNITED STATES PATENT AND TRADEMARK OFFICE
CERTIFICATE OF CORRECTION

PATENT NO.   : 6,544,323 B2
DATED        : April 8, 2003
INVENTOR(S)  : Jung-Gul An It is certified that error appears in the above-identified patent and that said Letters Patent is hereby corrected as shown below:

<u>Title page,</u>
Item [75], Inventor, "Tung-Gul An," should read -- Jung-Gul An, --

<u>Column 10,</u>
Line 14, "coated 0.1" should read -- coated from 0.1 --.

Signed and Sealed this

Ninth Day of December, 2003

JAMES E. ROGAN
*Director of the United States Patent and Trademark Office*